(12) United States Patent
Martello

(10) Patent No.: US 7,188,489 B2
(45) Date of Patent: Mar. 13, 2007

(54) PORTABLE AIR CONDITIONER

(76) Inventor: Russell A. Martello, 9822 Shoe Creek Dr., Baton Rouge, LA (US) 70818-3038

( * ) Notice: Subject to any disclaimer, the term of this patent is extended or adjusted under 35 U.S.C. 154(b) by 154 days.

(21) Appl. No.: 10/907,703

(22) Filed: Apr. 12, 2005

(65) Prior Publication Data
US 2006/0225453 A1    Oct. 12, 2006

(51) Int. Cl.
F25D 3/02  (2006.01)
(52) U.S. Cl. .................. 62/420; 62/457.1; 62/457.9
(58) Field of Classification Search .............. 62/420, 62/457.1, 459, 457.2, 464, 457.7, 457.9
See application file for complete search history.

(56) References Cited

U.S. PATENT DOCUMENTS

| | | | |
|---|---|---|---|
| 1,922,790 A | * | 8/1933 | Fern ......................... 62/425 |
| 2,802,347 A | | 8/1957 | Marcus |
| 2,885,189 A | * | 5/1959 | MacCracken ................ 165/46 |
| 3,387,650 A | * | 6/1968 | Masshake et al. ............ 165/75 |
| 3,961,496 A | | 6/1976 | Ku |
| 4,841,742 A | * | 6/1989 | Biby ......................... 62/420 |
| 5,046,329 A | | 9/1991 | Travis, III |
| 5,062,281 A | | 11/1991 | Oliphant et al. |
| 5,685,165 A | * | 11/1997 | Bigelow, Jr. ................ 62/420 |
| 5,762,129 A | * | 6/1998 | Elliott ..................... 165/48.1 |
| 6,170,282 B1 | | 1/2001 | Eddins |
| 6,227,004 B1 | * | 5/2001 | Gerstein ..................... 62/421 |
| 6,336,341 B1 | * | 1/2002 | McGraw et al. ............. 62/420 |
| 6,367,540 B1 | * | 4/2002 | Elliott ........................ 165/74 |
| 6,571,568 B1 | * | 6/2003 | Link ........................... 62/244 |

FOREIGN PATENT DOCUMENTS

JP    195724 A  * 11/1983

* cited by examiner

Primary Examiner—Mohammad M. Ali
(74) Attorney, Agent, or Firm—Roy, Kiesel, Keegan & DeNicola; Neil J. Coig

(57) ABSTRACT

A portable air conditioner utilizing low-power draw components, simple and efficient construction, and implementing simple ice water as the medium for heat exchange.

15 Claims, 5 Drawing Sheets

PORTABLE AIR CONDITIONER

BACKGROUND OF THE INVENTION

The present invention relates to a portable air conditioner, particularly one that is small in size, has low power requirements, and is simple in both construction and ease of use.

In the traditional method of air conditioning, a highly complex, bulky and expensive system of components is assembled in order to control the climate in a desired space. In addition to the mechanics of an air conditioner being both cost-prohibitive and complicated, air conditioners most often use costly and potentially hazardous liquids to facilitate heat exchange, such as Freon, which is a critical element of operation in a typical air conditioner. Further, the compressors, fans and other electrical equipment required for use in an ordinary air conditioner typically necessitate large amounts of electricity, which are not always available in every location in which air conditioning is desired.

Obvious downsides to this traditional method of climate control exist when attempting to employ it in a portable form, namely, when a portable air conditioning solution is desired, the extensive requirements to operate an ordinary air conditioner configuration make the prospect of a portable unit a difficult one, to say nothing of the cost involved. Additionally, the heft and size of a traditional air conditioner are also non-conducive to an efficient portable solution.

The present invention of a portable air conditioner is thus a much-improved apparatus and method of implementing an air conditioning system that can be used in virtually limitless applications and locations, primarily because it overcomes the multitude of problems recited above.

All of these aspects of the current mode of air conditioning lead to an increased need for a revised apparatus and method of controlling the climate in a portable fashion with minimized cost and complexity, all of which the present invention addresses.

OBJECTS OF THE INVENTION

One object of the invention is to provide a truly portable air conditioner in both operation and power consumption.

Another object of this invention is to provide an air conditioning system that is reduced in cost to produce and operate.

Yet another object of this invention is to provide an air conditioner that is reduced in complexity, yet maintains its efficiency.

Still another object of this invention is to provide an air conditioner with a smaller footprint for ease in transport.

Other objects and advantages of this invention shall become apparent from the ensuing descriptions of the invention.

SUMMARY OF THE INVENTION

According to the present invention, a portable air conditioner utilizing low-power draw components, simple and efficient construction, and implementing simple ice water as the medium for heat exchange, is disclosed.

BRIEF DESCRIPTION OF THE DRAWINGS

The accompanying drawings illustrate an embodiment of this invention. However, it is to be understood that this embodiment is intended to be neither exhaustive, nor limiting of the invention. They are but examples of some of the forms in which the invention may be practiced.

DETAILED DESCRIPTION OF EXEMPLARY EMBODIMENTS

Figure 1:
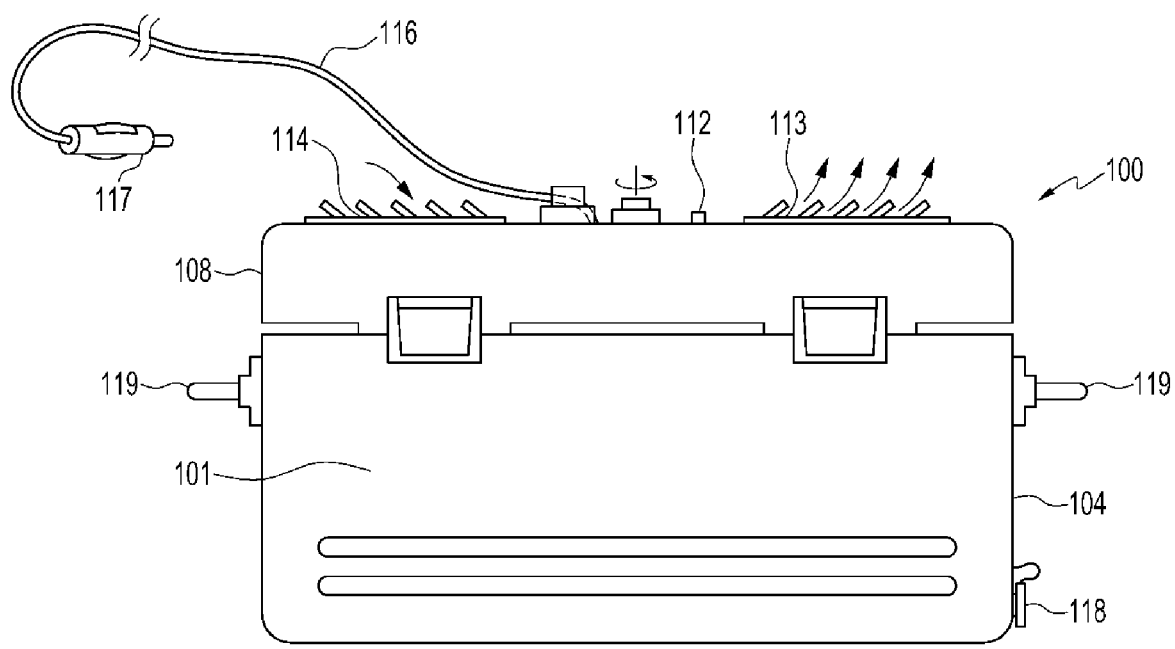
FIG. 1 is a front view of the portable air conditioner.
Figure 2:
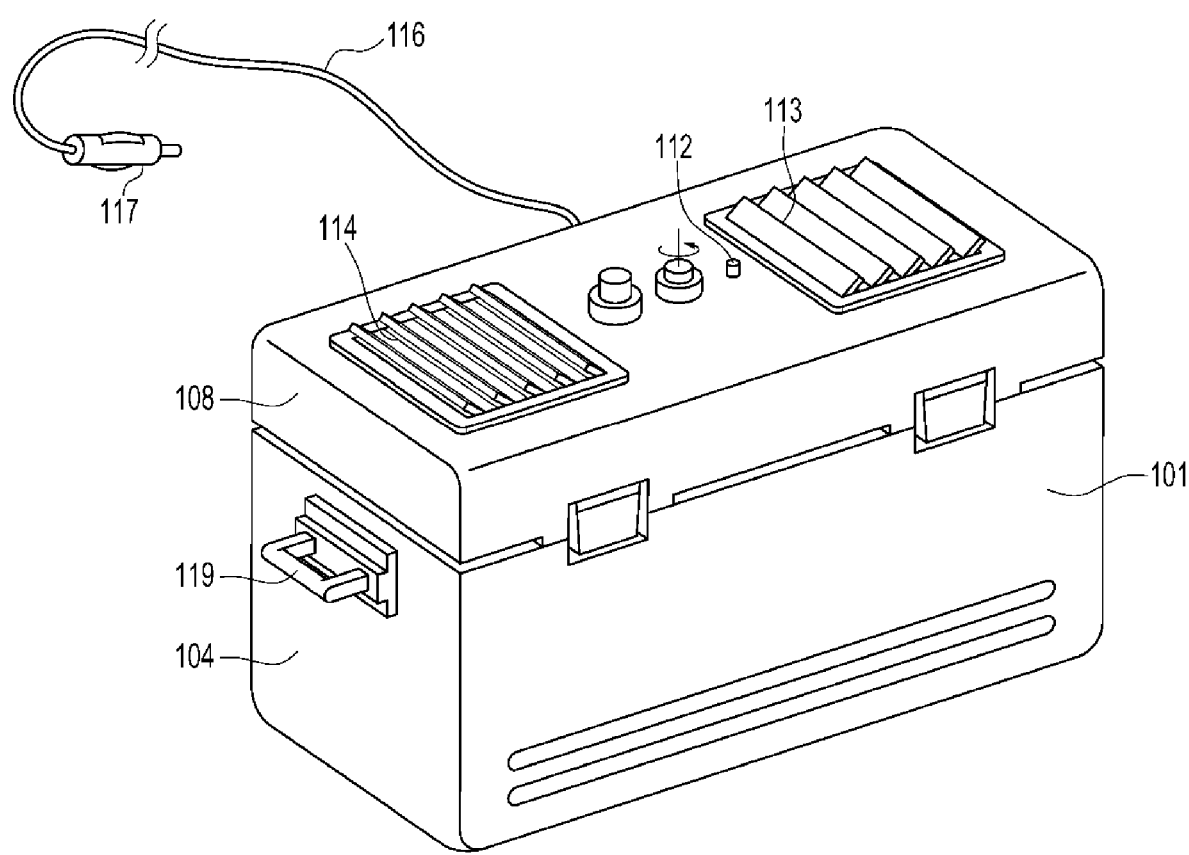
FIG. 2 is a perspective view of the portable air conditioner.
Figure 3:
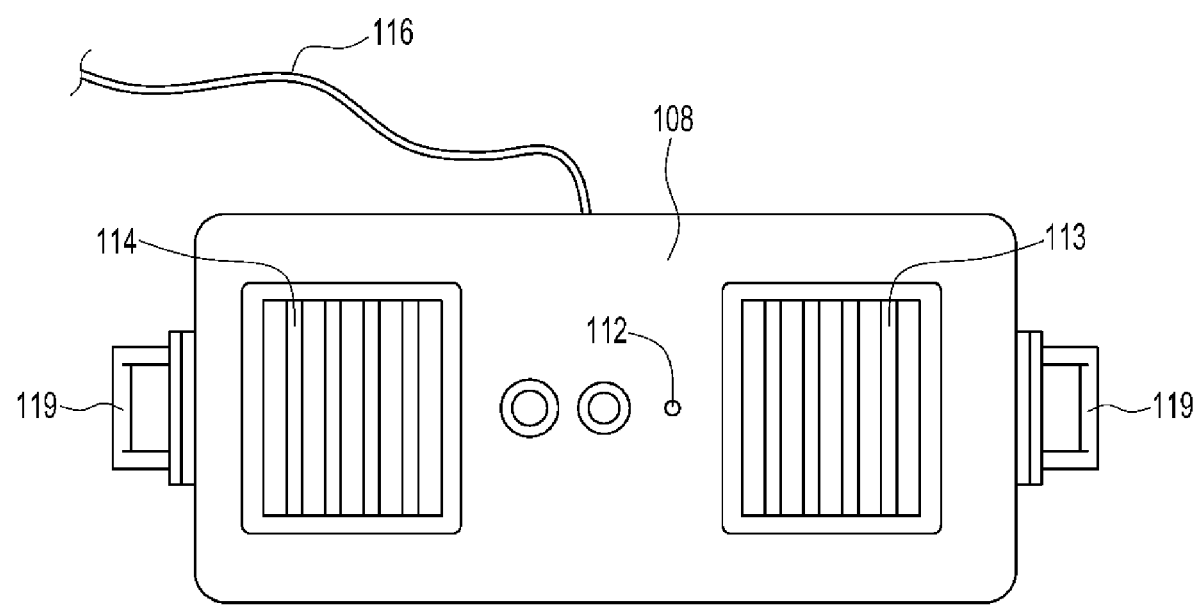
FIG. 3 is a top view of the portable air conditioner.
Figure 4:
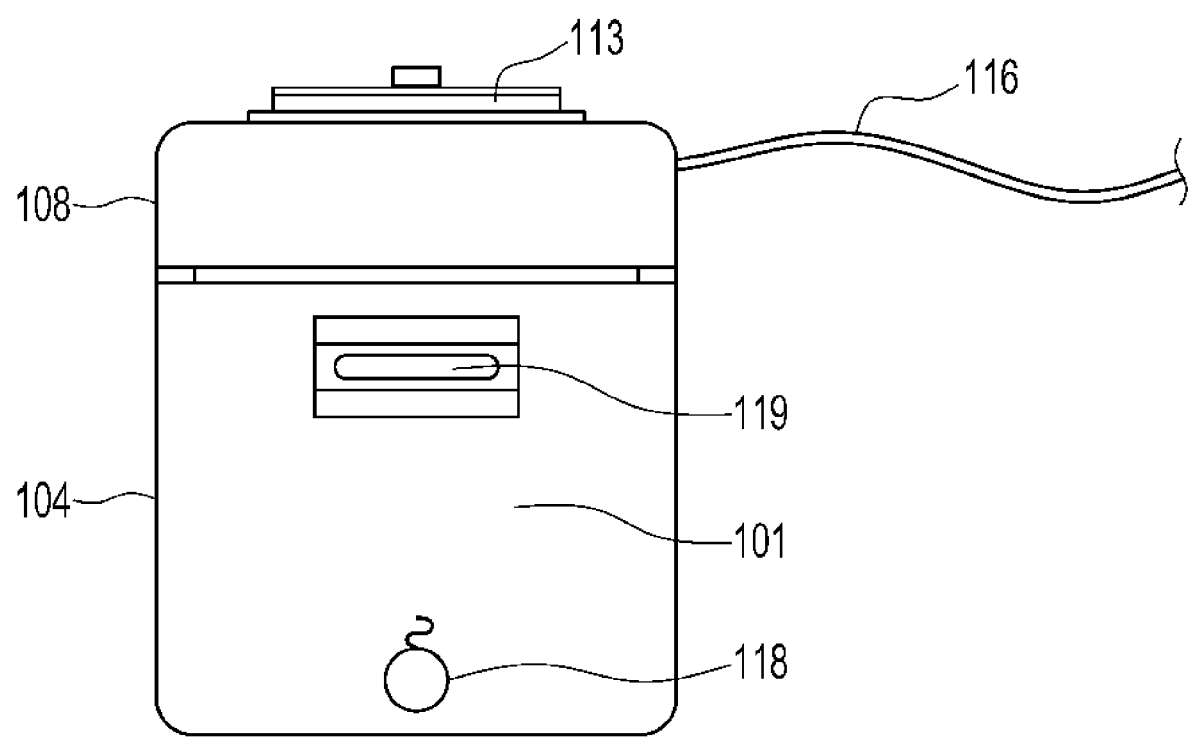
FIG. 4 is a side view of the portable air conditioner.
Figure 5:
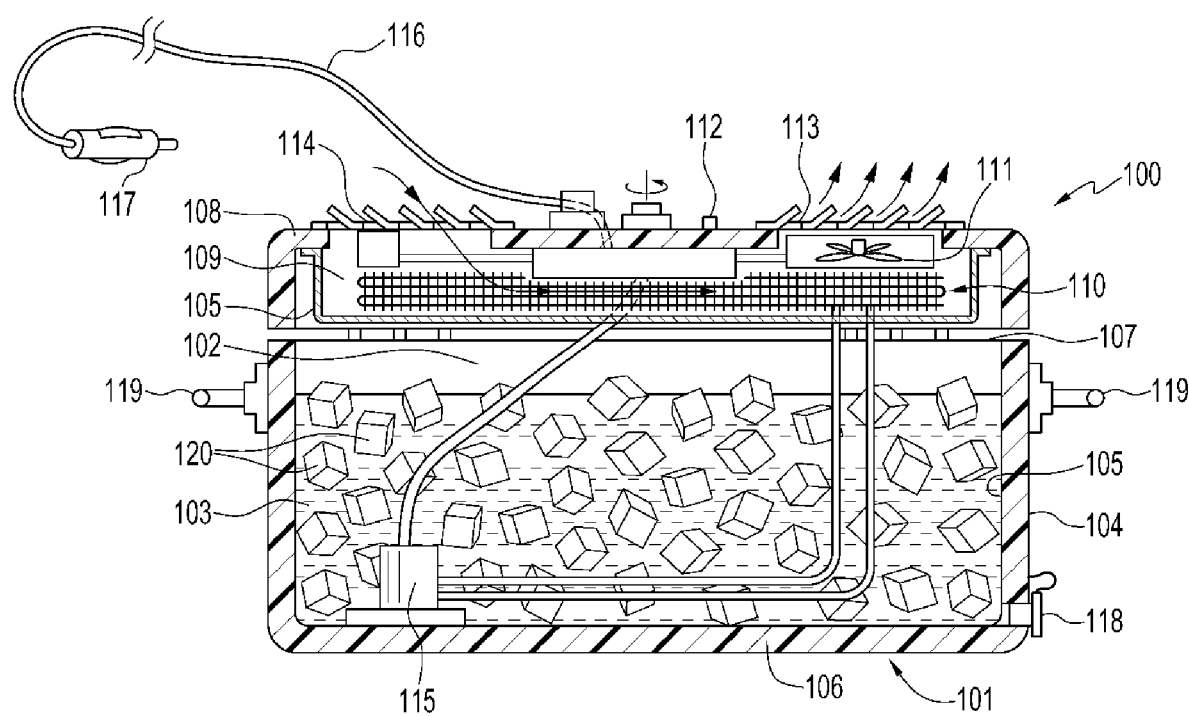
FIG. 5 is a cutaway view of the portable air conditioner.

Without any intent to limit the scope of this invention, reference is made to the figures in describing the various embodiments of the invention. FIGS. 1–5 show various aspects of exemplary embodiments of the present invention.

As seen in the Figures, portable air conditioner 100 is an insulated structure 101 which can be any shape, but the pictured representation of an exemplary embodiment is a rectangular box. Insulated structure 101 is shaped so as to form a reservoir 102 within the walls of insulated structure 101 that is capable of holding fluid 103 without losing fluid 103. Fluid 103 is the medium for the heat exchange required in order to achieve air conditioning, which is explained in greater detail below.

Insulated structure 101 can be of various types of construction, but most commonly will have double-walled construction, which consists of exterior wall 104, interior wall 105 and insulating material 106 sandwiched between. Of course, other types of insulating structures could just as easily be used, such as a highly-efficient injection molded material, a solid ceramic material, or any number of other efficient insulators. At least one end of insulated structure 101 will be open end 107 so as to allow access to the interior of insulated structure 101.

Open end 107 will have corresponding lid 108 that will sealingly engage open end 107 of insulated structure 101 so as to create a substantially airtight compartment within insulated structure 101. Lid 108 will also form, or have as part of its structure, compartment 109 which is shaped to receive various components of portable air conditioner 100. Such components include evaporator coil 110, as well as fan 111, and switch 112. Switch 112 can be of many different types, ranging from a simple on/off switch, a timed momentary, or a thermostat which can monitor the ambient temperature and turn on/off portable air conditioner 100 based on such temperature relative to the desired temperature as selected by a user.

Lid 108 can have various shapes, sizes and configurations, but will preferably be streamlined to be as small as possible, and configured to engage reservoir 102 so as to create a substantially airtight seal. Generally speaking, reservoir 102 will be at least two-thirds of the overall size of portable air conditioner 100. Lid 108 will also have incorporated in it discharge outlet 113 and return inlet 114 which are essentially openings in said lid on opposing sides of evaporator coil 110. Lid 108 may also contain recirculating pump 115, or pump 115 may be located in reservoir 102, provided pump 115 is water resistant to prevent the intrusion of fluid 103 into pump's 115 internal components. Pump 115 is connected to evaporator coil 110 on one side, and to reservoir 102 on the other side.

A common substitute for a dedicated apparatus for portable air conditioner 100 as described above would be to employ solely lid 108 as described above on an existing insulated container, such as an ice chest or other suitable container. In this way, less material would have to be produced, packaging could be minimized, and users could take advantage of their existing insulated structures 101.

Power cord 116 is employed to energize the components which require electricity to operate, such as pump 115 and fan 111. Typically, power cord 116 would be attached to switch 112, which would in turn, distribute power to the other components which required power, however, power cord 116 can be directly connected to the desired components in a simplified iteration of the air conditioner 100. Power cord's 116 connections can vary depending upon the application, but will probably be most useful as an industry-standard 12v cigarette lighter plug 117. However, it should be recognized that this connection type could just as easily be alligator clips for attaching to a battery, or a 120v plug, battery holder, or the like.

Other miscellaneous components of portable air conditioner 100 can also be employed, depending on the application. Drain plug 119 can be used to facilitate the evacuation of fluid 103 from reservoir 102 once heat exchange is completed, or to "top off" reservoir 102. Handles 119 can also be included in the design, such as those pictured in the Figures attached to exterior wall 104 of insulated structure 101 to facilitate the easy transport of portable air conditioner 100.

In operation, portable air conditioner 100 will be operated by first filling reservoir 102 with cooling fluid 103, which in the exemplary embodiment pictured in the Figures is ice water. In terms of this invention, cooling fluid 103 is essentially a quantity of ice 120 with a small amount of added water to permit fluid 103 to be picked up by pump 115. As heat exchange occurs, ice 120 will melt, increasing the amount of fluid 103 available, eliminating the need to add additional fluid 103 during operation, i.e., fluid 103 will only need to be added once to get the process started.

Other fluids may be used, or alterations made to enhance either the cooling effect or the longevity of the fluid. To create a greater split, or differential between the return air (intake) and the discharge air (exhaust), an additive such as salt may be added to lower the temperature of fluid 103 while keeping fluid 103 in a liquid form so that it may freely flow through pump 115 and evaporator coil 110.

Once fluid 103 has been added to reservoir 102, lid 108 should be fitted to insulated structure 101 in order to keep fluid 103 as cold as possible, to optimize the efficiency of portable air conditioner 100. Plug 117 should be connected to an appropriate power source, whether that be a battery, a car's 12v outlet, or a wall outlet, depending on the application. At that point, switch 112, thermostat, or other controlling device should be activated to begin the cooling process.

When energized, fan 111 and pump 115 will begin to operate, with pump 115 drawing cold water up from reservoir 102 and through evaporator coil 110, then back into reservoir 102. Simultaneously, fan 111 will draw the ambient air from near return inlet 114 into compartment 109 and move the air across the cold evaporator coil 110. Once the air is cooled, it will be continually drawn by fan 111 out of compartment 109 and sent out through discharge outlet 113 into the space desired to be climate controlled, thus cooling such space.

In this fashion, the ambient air is continually cooled until switch 112 is deactivated, or if a thermostat is employed, until the ambient air reaches the set temperature. Portable air conditioner 100 can thus be cycled on and off as needed to cool the environment immediately surrounding portable air conditioner 100. Alternatively, pump 115 could be cycled on and off while fan 111 continues to run, such that air is continually moved. As fluid 103 is warmed and reaches equilibrium with the ambient air temperature, the efficiency of cooling naturally decreases and eventually reaches a zero cooling effect. At such point, drain plug 118 can be removed to permit much of fluid 103 to be evacuated, and more ice 120 added to reduce the temperature of fluid 103 again.

It is worth noting that this setup might also be used for heating, by replacing cold fluid 103 with a hot liquid, or fluid 103 that contains hot packs or other items capable of storing heat for extended periods of time. Air would then be warmed as it passed across evaporator coil 110.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A portable air conditioner comprising:
   an insulated housing forming a reservoir, and having at least one open side;
   said housing having an insulated lid configured to sealingly engage said insulated housing, said lid forming a compartment within said lid;
   said reservoir having at least two-thirds of the volume of said portable air conditioner;
   said compartment containing an evaporator coil;
   said compartment containing a fan operatively configured to be in fluid communication with the exterior of said evaporator coil;
   a recirculating pump in fluid communication with the interior of said evaporator coil and with said reservoir;
   at least one switch operatively attached to said recirculating pump and said fan to control the operation of said recirculating pump and said fan;
   a power cord operatively attached to a thermostat and to said switch;
   a discharge outlet operatively configured in said lid and being in fluid communication with said evaporator coil;
   a return inlet operatively located in said lid and being in fluid communication with said evaporator coil.

2. The portable air conditioner of claim 1 wherein said switch is a thermostat.

3. The portable air conditioner of claim 1 further comprising a drain plug operatively configured in said housing to permit the expulsion of fluid.

4. The portable air conditioner of claim 1 further comprising at least one handle configured on said housing to facilitate transport of said portable air conditioner.

5. The portable air conditioner of claim 1 further comprising a cooling fluid in said insulated housing.

6. The portable air conditioner of claim 5 wherein said cooling fluid is a mixture of water and salt.

7. A portable air conditioner comprising:
   an ice chest forming a reservoir, and having at least one open side;
   said ice chest having an insulated lid configured to sealingly engage said ice chest, said lid forming a compartment within said lid;
   said reservoir having at least two-thirds of the volume of said portable air conditioner;
   said compartment containing an evaporator coil;
   said compartment containing a fan operatively configured to be in fluid communication with the exterior of said evaporator coil;

a recirculating pump in fluid communication with the interior of said evaporator coil and with said reservoir;

at least one switch operatively attached to said recirculating pump and said fan to control the operation of said recirculating pump and said fan;

a power cord operatively attached to a thermostat and to said switch;

a discharge outlet operatively configured in said lid and being in fluid communication with said evaporator coil;

a return inlet operatively located in said lid and being in fluid communication with said evaporator coil.

8. The portable air conditioner of claim 7 wherein said switch is a thermostat.

9. The portable air conditioner of claim 7 further comprising a drain plug operatively configured in said ice chest to permit the expulsion of fluid.

10. The portable air conditioner of claim 7 further comprising at least one handle configured on said housing to facilitate transport of said portable air conditioner.

11. The portable air conditioner of claim 7 further comprising a cooling fluid in said ice chest.

12. The portable air conditioner of claim 11 wherein said cooling fluid is a mixture of water and salt.

13. A portable air conditioner comprising:

an insulated lid configured to sealingly engage an insulated housing, said lid forming a compartment within said lid;

said compartment containing an evaporator coil;

said compartment containing a fan operatively configured to be in fluid communication with the exterior of said evaporator coil;

a recirculating pump in fluid communication with said evaporator coil and with said insulated housing;

at least one switch operatively attached to said recirculating pump and said fan to control the operation of said recirculating pump and said fan;

a power cord operatively attached to a thermostat and to said switch;

a discharge outlet operatively configured in said lid and being in fluid communication with said evaporator coil;

a return inlet operatively located in said lid and being in fluid communication with said evaporator coil.

14. The portable air conditioner of claim 13 wherein said switch is a thermostat.

15. A portable air conditioner comprising:

an insulated housing forming a reservoir, and having at least one open side;

said housing having an insulated lid configured to sealingly engage said insulated housing, said lid forming a compartment within said lid;

said compartment containing an evaporator coil;

said compartment containing a fan operatively configured to be in fluid communication with the exterior of said evaporator coil;

a recirculating pump in fluid communication with the interior of said evaporator coil and with said reservoir;

at least one switch operatively attached to said recirculating pump and said fan to control the operation of said recirculating pump and said fan;

a power cord operatively attached to a thermostat and to said switch;

a discharge outlet operatively configured in said lid and being in fluid communication with said evaporator coil;

a return inlet operatively located in said lid and being in fluid communication with said evaporator coil.

* * * * *